(12) United States Patent
Gormley (10) Patent No.: US 11,927,150 B2
(45) Date of Patent: Mar. 12, 2024

(54) DRIVE SYSTEM FOR TRANSLATING STRUCTURE

(71) Applicant: ROHR, INC., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/874,825

(22) Filed: Jul. 27, 2022

(65) Prior Publication Data

US 2022/0381200 A1   Dec. 1, 2022

Related U.S. Application Data

(62) Division of application No. 16/674,866, filed on Nov. 5, 2019, now Pat. No. 11,434,848.

(51) Int. Cl.

| F02K 1/76 | (2006.01) |
| --- | --- |
| F02C 7/32 | (2006.01) |
| F02K 1/09 | (2006.01) |
| F02K 1/15 | (2006.01) |
| F02K 1/72 | (2006.01) |
| F02K 3/04 | (2006.01) |

(52) U.S. Cl.
CPC ............... *F02K 1/763* (2013.01); *F02C 7/32* (2013.01); *F02K 1/09* (2013.01); *F02K 1/15* (2013.01); *F02K 1/72* (2013.01); *F02K 1/766* (2013.01); *F02K 3/04* (2013.01); *F05D 2260/4031* (2013.01); *F05D 2260/53* (2013.01)

(58) Field of Classification Search
CPC ..... F02K 1/72; F02K 1/09; F02K 1/15; F02K 1/763; F02K 1/766; F05D 2260/4031; F05D 2260/53
See application file for complete search history.

(56) References Cited

U.S. PATENT DOCUMENTS

| 5,209,057 | A | 5/1993 | Remlaoui |
| --- | --- | --- | --- |
| 5,448,884 | A | 9/1995 | Repp |
| 8,726,634 | B2 | 5/2014 | Vauchel et al. |
| 9,303,590 | B2 | 4/2016 | West et al. |
| 9,863,367 | B2 | 1/2018 | Burghdoff et al. |
| 9,915,226 | B2 | 3/2018 | Gormley |
| 10,012,176 | B2 | 7/2018 | Todorovic et al. |
| 2011/0120078 | A1 | 5/2011 | Schwark, Jr. et al. |
| 2012/0138707 | A1* | 6/2012 | Vauchel ................. F02K 1/763 239/265.29 |

(Continued)

OTHER PUBLICATIONS

USPTO; Restriction/Election Requirement dated Nov. 30, 2021 in U.S. Appl. No. 16/674,866.

(Continued)

*Primary Examiner* — Andrew H Nguyen
(74) *Attorney, Agent, or Firm* — SNELL & WILMER L.L.P.

(57) ABSTRACT

A nacelle may comprise a fixed structure and a translating structure configured to translate relative to the fixed structure. A first drive system may be operationally coupled to the translating structure. The drive system may comprise a primary actuator coupled to the fixed structure and including a primary rod and a primary gear rotationally coupled to the primary rod, a torque shaft rotationally coupled to the primary gear, and a secondary actuator operationally coupled to the primary actuator via the torque shaft.

9 Claims, 9 Drawing Sheets

(56) References Cited

U.S. PATENT DOCUMENTS

2017/0016413 A1* 1/2017 Karnofski ................ F02K 1/16
2018/0274485 A1   9/2018 Gormley et al.

OTHER PUBLICATIONS

USPTO; Pre-Interview First Office Action dated Feb. 16, 2022 in U.S. Appl. No. 16/674,866.
USPTO; Notice of Allowance dated May 18, 2022 in U.S. Appl. No. 16/674,866.

* cited by examiner

DRIVE SYSTEM FOR TRANSLATING STRUCTURE

CROSS-REFERENCE TO RELATED APPLICATIONS

This application is a divisional of, and claims priority to and the benefit of, U.S. application Ser. No. 16/674,866, filed Nov. 5, 2019, and entitled "DRIVE SYSTEM FOR TRANSLATING STRUCTURE," which is incorporated herein by reference in its entirety for all purposes.

FIELD

The present disclosure relates generally to nacelle systems and, more particularly, to translating components of nacelle systems and drive systems used to translate such components.

BACKGROUND

Modern aircraft typically utilize one or more gas turbine engines for propulsion. The engines may be housed in a nacelle, which may be wing-mounted, fuselage-mounted, tail-mounted, or some combination thereof. Typical turbofan jet engines include a fan that draws and directs a flow of ambient air into the nacelle and into and around an engine core to form, respectively, a core engine flow and a bypass flow. The core engine flow is initially passed through a compressor and then through a combustor where a pressurized core engine flow is mixed with fuel and ignited. Combustion of the fuel and air mixture results in a stream of high temperature and high pressure gas that is used to rotate a turbine downstream of the combustor. The compressor and the fan are rotated via connection to the rotating turbine. The gas exiting the turbine is thereafter directed through an exhaust nozzle at the rear of the engine and expelled to the atmosphere.

The bypass flow is directed about the engine core and constrained by an inner wall of the nacelle. In turbofan engines, the bypass flow typically provides the main thrust for an aircraft. The bypass flow may also be used to decelerate an aircraft after landing or during a rejected takeoff. Thrust reversers mounted in the structure of the nacelle selectively reverse the direction of the bypass flow via a cascade array to generate reverse thrust. One or more blocker doors may be situated on the translating sleeve and deployed into the bypass flow. Once deployed, the blocker doors redirect a portion of the bypass flow into and through the cascade array to produce a flow of high-velocity air having a vector component in the forward direction, reversing the thrust of the engine and thereby decelerating the aircraft.

During normal engine operation, the bypass flow exits the engine through a fan nozzle, typically disposed radially outward of the exhaust nozzle. Some aircraft nacelles have a variable area fan nozzle (VAFN) configured to slide, pivot, or otherwise open to increase or decrease the area of one or more aft opening(s) through which the bypass flow may exit the nacelle. By selectively varying the exit area of the fan nozzle, various operating characteristics—e.g., the fan pressure ratio of the engine—may be adjusted to match a particular flight condition. VAFN structures are typically disposed aft of and connected to one or more translating sleeves of the thrust reverser.

SUMMARY

A drive system for deploying blocker doors on a translating nozzle of a variable area fan nozzle of a nacelle relative to a thrust reverser and a fixed structure of the nacelle is disclosed herein. In accordance with various embodiments, the drive system may comprise a primary actuator, a torque shaft, and a secondary actuator operationally coupled to the primary actuator via the torque shaft. The primary actuator may include an opening actuator configured to attach to the fixed structure, a closing actuator configured to attach to the fixed structure, a first primary rod configured to be driven by the opening actuator, a second primary rod configured to be driven by the closing actuator, and a primary gear rotationally coupled to the first primary rod and the second primary rod. The torque shaft may be rotationally coupled to the primary gear. The secondary actuator may comprise a secondary gear rotationally coupled to the torque shaft and a secondary rod configured to be driven linearly by the secondary gear.

In various embodiments, the secondary rod may include a plurality of teeth configured to engage the secondary gear. In various embodiments, the secondary rod may be configured to attach to the translating nozzle. In various embodiments, the primary gear may be configured to attach to the thrust reverser.

In various embodiments, the drive system may further comprise a locking assembly configured to restrict translation of the translating nozzle relative to the thrust reverser in response to deployment of the thrust reverser. In various embodiments, the locking assembly may comprise an interference member biased toward the primary gear, and a contact member coupled to the interference member and configured to contact the fixed structure when the thrust reverser is in a stowed configuration.

A drive system for translating a translating sleeve of a thrust reverser of a nacelle relative to a fixed structure of the nacelle is also disclosed herein. In accordance with various embodiments, the drive system may comprise a first primary actuator, a torque shaft, and a secondary actuator operationally coupled to the first primary actuator via the torque shaft. The first primary actuator may include a first primary rod configured to attach to the fixed structure, and a first primary gear rotationally coupled to the first primary rod. The torque shaft may be rotationally coupled to the first primary gear. The secondary actuator may be configured to translate a blocker door of the thrust reverser between a stowed-blocker-door position and a deployed-blocker-door position in response to rotation of the first primary gear.

In various embodiments, the secondary actuator may comprise a secondary gear rotationally coupled to the torque shaft, and a secondary rod including a plurality of teeth configured to engage the secondary gear. The secondary rod may be configured to translate the blocker door in response to rotation of the secondary gear.

In various embodiments, the secondary actuator may comprise a secondary gear system rotationally coupled to the torque shaft, and a link coupled to the secondary gear system. The link may be configured to translate the blocker door in response to rotation of the secondary gear system.

In various embodiments, the first primary gear may be configured to translate linearly relative to the first primary rod in response to a deployment of the translating sleeve.

In various embodiments, the secondary actuator may be configured to translate the blocker door to the deployed-blocker-door position in response to rotation of the first primary gear in a first circumferential primary gear direction. In various embodiments, the secondary actuator may be configured to translate the blocker door to the stowed-blocker-door position in response to rotation of the first primary gear in a second circumferential primary gear direction opposite the first circumferential primary gear direction.

In various embodiments, the drive system may further comprise a second primary actuator including a second primary rod configured to attach to the fixed structure and a second primary gear rotationally coupled to the second primary rod.

A nacelle is also disclosed herein. In accordance with various embodiments, the nacelle may comprise a fixed structure, a first translating structure configured to translate relative to the fixed structure, and a first drive system operationally coupled to the first translating structure. The first drive system may comprise a first primary actuator, a first torque shaft, and a first secondary actuator operationally coupled to the first primary actuator via the first torque shaft. The first primary actuator may be coupled to the fixed structure and may include a first primary rod and a first primary gear rotationally coupled to the first primary rod. The first torque shaft may be rotationally coupled to the first primary gear.

In various embodiments, the nacelle may further comprise a thrust reverser including a translating sleeve and a blocker door. The first translating structure may comprise the translating sleeve of the thrust reverser. The first secondary actuator may be configured to translate the blocker door of the thrust reverser between a stowed-blocker-door position and a deployed-blocker-door position in response to rotation of the first primary gear.

In various embodiments, the nacelle may further comprise a variable area fan nozzle including a translating nozzle. The first translating structure may comprise the translating nozzle. The first secondary actuator may comprise a secondary gear rotationally coupled to the first torque shaft, and a secondary rod coupled to the translating nozzle and configured to be driven linearly by the secondary gear.

In various embodiments, the nacelle may further comprise a second translating structure configured to translate relative to the fixed structure and the first translating structure. A second drive system may be operationally coupled to the second translating structure. The second drive system may comprise a second primary actuator coupled to the fixed structure and including a second primary rod and a second primary gear rotationally coupled to the second primary rod, a second torque shaft rotationally coupled to the second primary gear, and a second secondary actuator operationally coupled to the second primary actuator via the second torque shaft.

In various embodiments, the nacelle may further comprise a thrust reverser and a variable area fan nozzle including a translating nozzle. The thrust reverser may include a translating sleeve and a blocker door. The variable area fan nozzle may include a translating nozzle. The first translating structure may comprise the translating sleeve of the thrust reverser. The first secondary actuator may be configured to translate the blocker door of the thrust reverser between a stowed-blocker-door position and a deployed-blocker-door position in response to rotation of the first primary gear. The second translating structure may comprise the translating nozzle. The second secondary actuator may comprise a secondary gear rotationally coupled to the second torque shaft, and a secondary rod coupled to the translating nozzle and configured to be driven linearly by the secondary gear.

In various embodiments, the second drive system may further comprise a locking assembly configured to restrict a translation of the translating nozzle relative to the translating sleeve in response to a translation of the translating sleeve away from the fixed structure.

In various embodiments, the locking assembly may comprise an interference member biased toward the second primary gear of the second drive system, and a contact member coupled to the interference member and configured to contact the fixed structure when the thrust reverser is in a stowed configuration.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
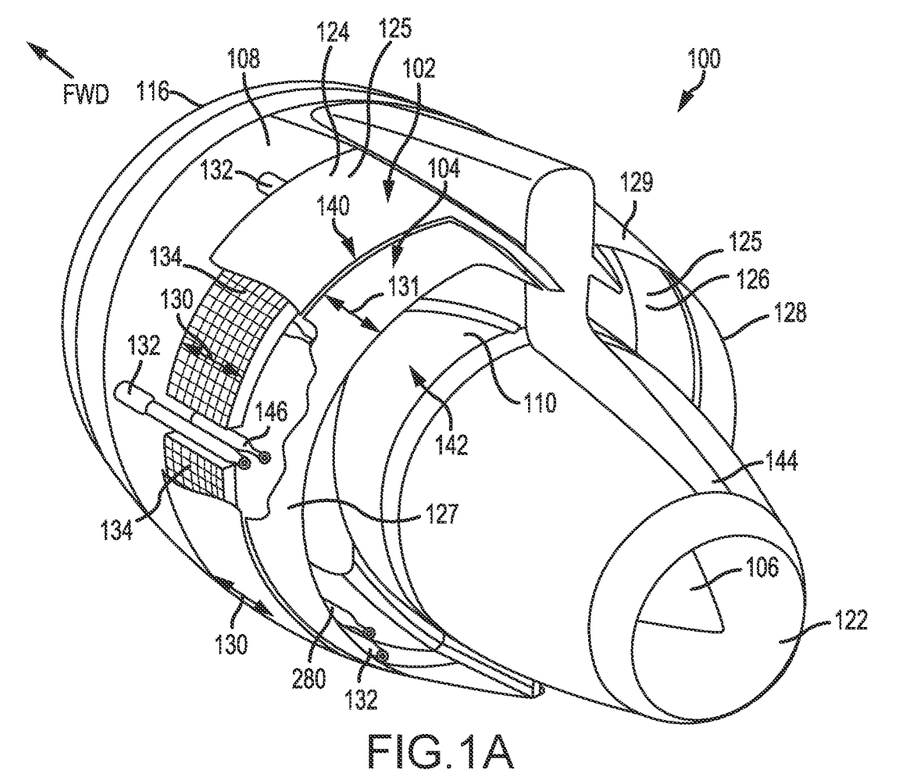
FIG. 1A is a perspective view of an aircraft engine having a translating cascade-type thrust reverser and a translating variable area fan nozzle, in accordance with various embodiments.
Figure 1B:
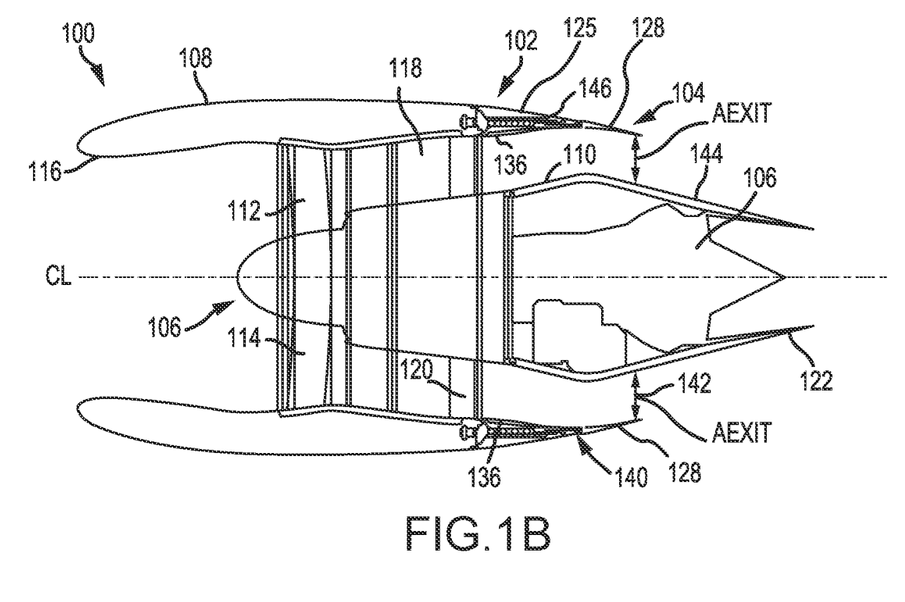
FIG. 1B is a cross sectional view of the aircraft engine illustrated in FIG. 1A, in accordance with various embodiments.
Figure 1C:
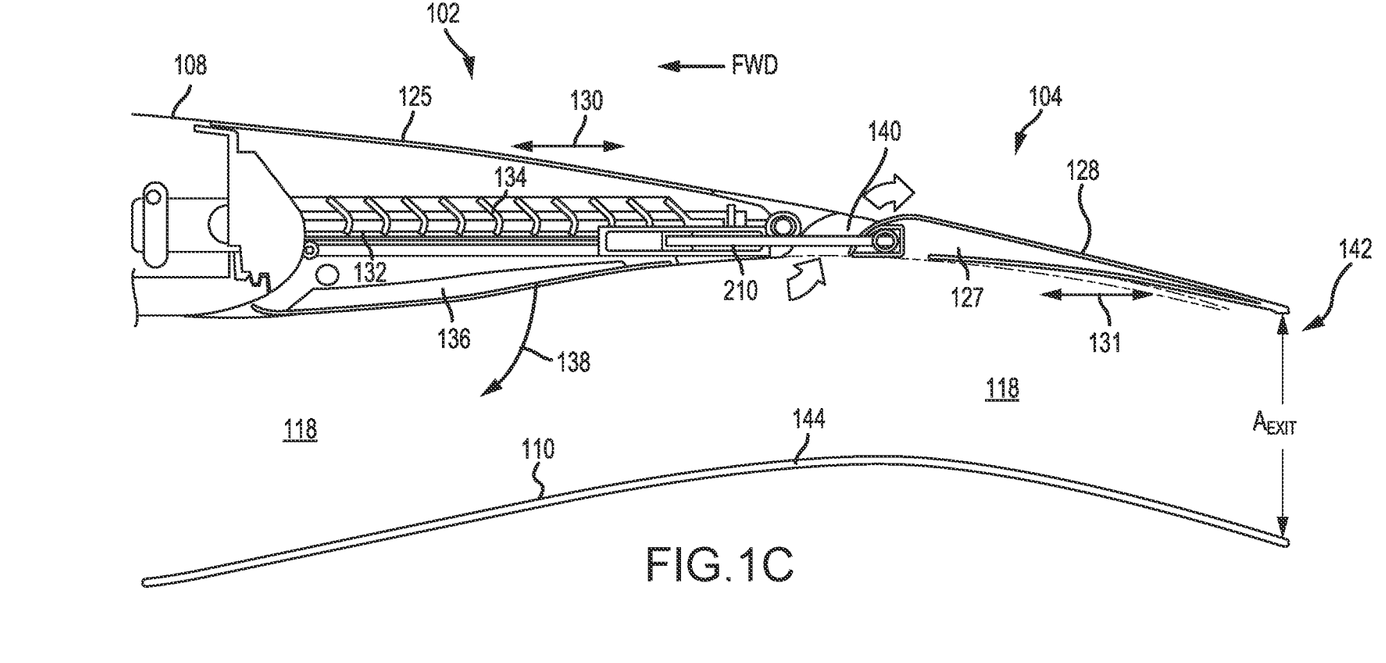
FIG. 1C is a close up cross sectional view of the translating cascade-type thrust reverser and the translating variable area fan nozzle illustrated in FIGS. 1A and 1B, in accordance with various embodiments.

Referring now to the drawings, FIGS. 1A, 1B and 1C illustrate perspective and cross sectional views of a propulsion system 100. Propulsion system 100 includes an engine 106 and a nacelle 108 surrounding engine 106. Engine 106 is at least partially housed within an inner fixed structure 110. A fan 112 of engine 106 is positioned within an upstream portion of nacelle 108 and includes a plurality of fan blades 114 that are mounted on a rotor. Fan 112 rotates about an engine centerline CL, and draws a flow of air through an inlet 116 of nacelle 108. A bypass duct 118 is defined between engine 106 and nacelle 108. The air flow drawn into the propulsion system 100 via inlet 116 of nacelle 108 is accelerated by fan 112. A portion of the incoming air flow is directed into and through engine 106 as a core engine flow. A bypass flow enters the upstream end of nacelle 108 and flows around and past engine 106 and inner fixed structure 110. The bypass flow is accelerated by the fan 112, then passes through bypass duct 118, which may include one or more stators 120, and then exits nacelle 108 through variable area fan nozzle 104. At the same time, a high-pressure and high-temperature exhaust stream exits engine 106 through an exhaust nozzle 122 located at the aft end of engine 106.

Still referring to FIGS. 1A, 1B and 1C, nacelle 108 includes a thrust reverser 102 of the translating-sleeve-cascade-type and a variable area fan nozzle 104 of the translating-type, in accordance with various embodiments. In to FIGS. 1A, 1B and 1C, thrust reverser 102 and variable area fan nozzle 104 are shown in the stowed configuration and the closed position, respectively. Thrust reverser 102 may be positioned forward of variable area fan nozzle 104. More specifically, in various embodiments, thrust reverser 102 includes a translating sleeve 125. Translating sleeve 125 may include one or more translating sleeve sections, such as, for example, a first translating sleeve section 124 and a second translating sleeve section 126 positioned opposite first translating sleeve section 124, with both first and second translating sleeve sections 124, 126 positioned forward of a translating nozzle 128 of variable area fan nozzle 104. Translating sleeve 125 is configured to translate in the fore and aft directions (as indicated by bidirectional arrow 130) and is operated by a sleeve actuator 132 (or a plurality of sleeve actuators spaced circumferentially about engine 106). Translating sleeve 125, when in the stowed configuration, covers a cascade array 134 (or an array of cascade passages). Translation of translating sleeve 125 in the aft direction to a deployed configuration results in deployment of a blocker door 136 (or a plurality of blocker doors spaced circumferentially about engine 106), as indicated by the directional arrow 138 in FIG. 1C. Deployment of blocker door(s) 136 into bypass duct 118 causes a portion of the bypass flow to exit bypass duct 118 through cascade array 134, which turns the exiting flow in a generally forward direction to create reverse thrust.

Translating nozzle 128 of variable area fan nozzle 104 may be selectively adjusted as engine 106 operates under different flight conditions. As discussed above, such an adjustment may be used to match engine performance to particular flight conditions. As shown in FIG. 1B, translating nozzle 128 may be selectively translated (e.g., moved fore and aft) to vary an exit area "$A_{EXIT}$" of the exit of variable area fan nozzle 104 (or a primary fan nozzle exit 142) and to adjust an amount of the bypass flow spilled through an upstream exit 140 formed by a gap between translating nozzle 128 and translating sleeve 125. For purposes of illustration, variable area fan nozzle 104 is shown in the context of a turbofan jet aircraft engine. Further, in various embodiments, nacelle 108, having one or both of thrust reverser 102 and variable area fan nozzle 104, may be mounted to a wing or fuselage of an aircraft, for example, by a pylon or other similar support. In addition, while the disclosure that follows focuses primarily on thrust reverser 102 and variable area fan nozzle 104, the disclosure contemplates the systems and methods described herein to apply to any translating component, including, for example, and without limitation, translating nacelle inlet and exit components or surfaces and translating control surface components or surfaces, as well as components or surfaces associated with thrust reversers and variable area fan nozzles.

In various embodiments, translating nozzle 128 is an annular airfoil-like structure mounted proximate the trailing edge of translating sleeve 125 and which circumscribes an engine core cowl 144 or inner fixed structure 110. Due to the longitudinal variations in the diameter of the engine core cowl 144, selective fore and aft movement of translating nozzle 128 changes the size of the exit area $A_{EXIT}$ of primary fan nozzle exit 142. As shown in FIG. 1A, translating nozzle 128 can include a first nozzle section 127 and a second nozzle section 129, each being generally arcuate in shape and configured to translate in the axial direction (as indicated by bidirectional arrow 131). Translation of translating nozzle 128 affects a desired size of upstream exit 140, and also varies the outlet geometry and the exit area $A_{EXIT}$ of primary fan nozzle exit 142. Hence, when translating nozzle 128 is deployed, there is an increase in the bypass flow that is discharged through both upstream exit 140 and primary fan nozzle exit 142, which is enlarged as translating nozzle 128 translates in the aft direction. As illustrated in FIGS. 1A, 1B, and 1C, and as described in further detail below, translating nozzle 128 may be selectively translated fore and aft by a drive system 210.

Figure 2A:
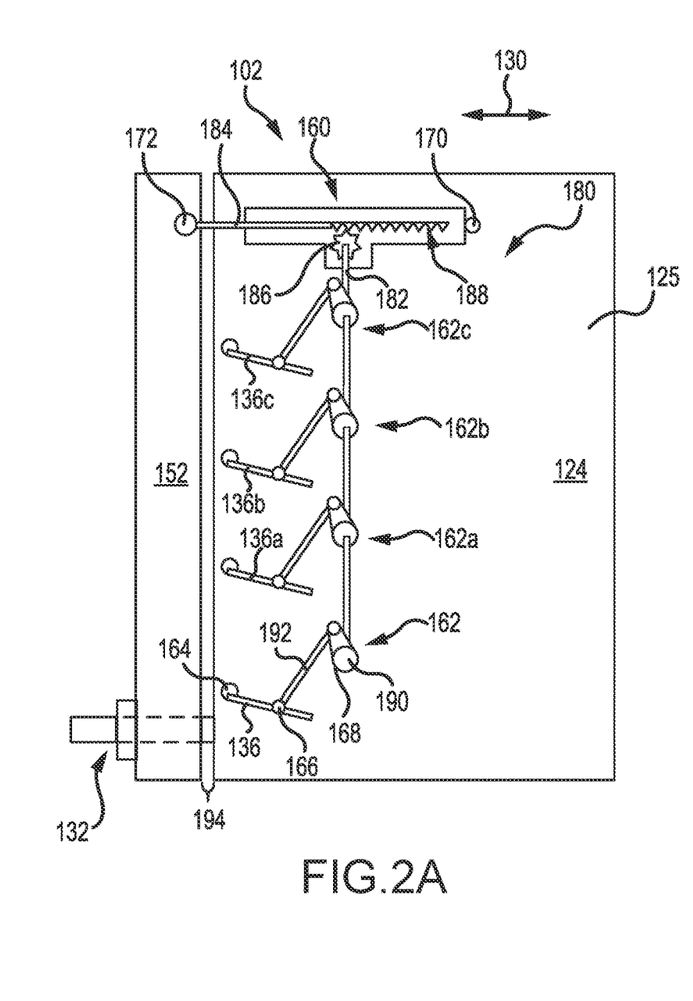
FIG. 2A is a schematic view of a translating sleeve thrust reverser in a stowed configuration and a drive system configured to translate a translating sleeve of the thrust reverser, in accordance with various embodiments.
Figure 2B:
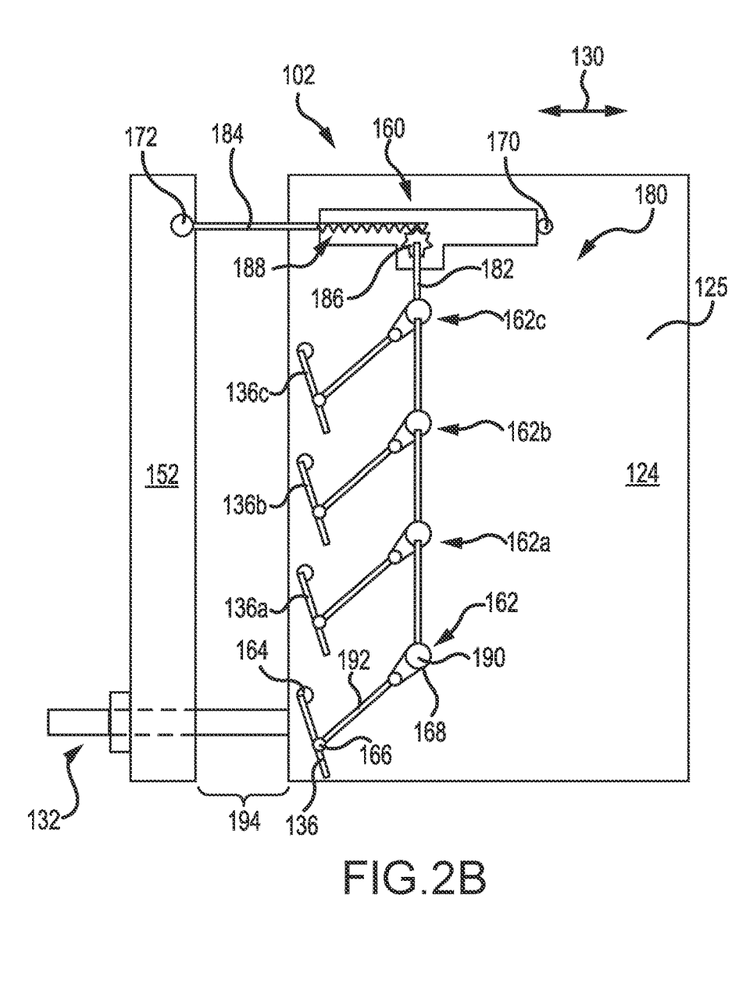
FIG. 2B is a schematic view of a translating sleeve thrust reverser in a deployed configuration and a drive system configured to translate a translating sleeve of the thrust reverser, in accordance with various embodiments.

Referring now to FIGS. 2A and 2B, schematic views of thrust reverser 102 in a stowed configuration and a deployed configuration, respectively, are provided. In accordance various embodiments, first translating sleeve section 124 of translating sleeve 125 is translated in fore and aft directions (as indicated by the bidirectional arrow 130) by sleeve actuator 132. Sleeve actuator 132 may comprise any suitable actuation system (or main actuator) capable of driving a rapid translation of first translating sleeve section 124, such as, for example, a ball screw mechanism or a hydraulic cylinder. While FIGS. 2A and 2B illustrate first translating sleeve section 124, it should be understood that second translating sleeve section 126, with momentary reference to FIG. 1A, may include the elements and functionalities as described herein with respect to first translating sleeve section 124.

In various embodiments, sleeve actuator 132 is connected between a fixed structure 152, such as, for example, a torque box, and translating sleeve 125. In various embodiments, thrust reverser 102 includes blocker doors 136. As described above, blocker doors 136 are configured to block a portion of a bypass flow in response to thrust reverser 102 translating to a deployed configuration. A primary actuator 160 (or a master actuator) is connected between fixed structure 152 and translating sleeve 125. One or more secondary actuator(s) 162 (or slave actuators) is/are operationally coupled to primary actuator 160. Each secondary actuator is connected to translating sleeve 125 and a blocker door 136. While, for clarity, the disclosure generally focuses on operation of blocker door 136 and secondary actuator 162, it shall be appreciated, as illustrated in FIGS. 2A and 2B, that thrust reverser 102 may include a plurality of blocker doors (e.g., a first blocker door 136, a second blocker door 136a, a third blocker door 136b, and a fourth blocker door 136c) operated by a plurality of secondary actuators (e.g., a first secondary actuator 162, a second secondary actuator 162a, a third secondary actuator 162b, and a fourth secondary actuator 162c), with each blocker door and each secondary actuator having the elements and functionalities as described herein with respect to blocker door 136 and secondary actuator 162.

In various embodiments, blocker door 136 may be coupled at a hinge 164 to translating sleeve 125 and at a hinge 166 to secondary actuator 162. Secondary actuator 162 may be coupled to translating sleeve 125 at any suitable location, such as at a hinge 168. Each of hinge 164, hinge 166, and hinge 168 is configured to enable blocker door 136 to pivot relative to translating sleeve 125 and in radially inward direction toward inner fixed structure 110, with momentary reference to FIGS. 1B and 1C, in respond to translation of translating sleeve 125 aft. In various embodiments, primary actuator 160 is coupled to first translating sleeve at a joint 170 and to fixed structure 152 at a joint 172.

With continued reference to FIGS. 2A and 2B, thrust reverser 102 includes a drive system 180 configured to drive or otherwise operate blocker doors 136. In various embodiments, drive system 180 includes primary actuator 160, secondary actuator(s) 162, and a torque shaft 182. Torque shaft 182 is configured to operationally couple primary actuator 160 to secondary actuator(s) 162. In various embodiments, torque shaft 182 may be a single, unibody member rotationally coupled to primary actuator 160 and each secondary actuator 162, or in various embodiments, torque shaft 182 may include a plurality of discrete links rotationally coupled between primary actuator 160 and secondary actuators 162.

In various embodiments, primary actuator 160 includes a primary rod 184 and a primary (or master) gear 186 rotationally coupled to primary rod 184. Primary rod 184 may be attached to fixed structure 152 at joint 172. Primary rod 184 may include a plurality of teeth 188 configured to engage (e.g., intermeshed with) primary gear 186. In this regard, primary gear 186 is configured to rotate in response to linear translation of primary rod 184 (e.g., fore and aft translation). In accordance with various embodiments, torque shaft 182 is rotationally coupled (e.g., via splined connection or any other suitable connection means) to primary gear 186. In this regard, rotation of primary gear 186 drives rotation of torque shaft 182.

In accordance with various embodiments, secondary actuator 162 includes a secondary (or slave) gear system 190 and a link 192. Secondary gear system 190 is rotationally coupled to torque shaft 182, such that rotation of torque shaft 182 drives rotation of secondary gear system 190. Rotation of secondary gear system 190 is configured to drive a translation of link 192. Secondary gear system 190 may include a gear train, a power hinge, a crank, and/or any desired connector capable of translating link 192 in response to rotation of torque shaft 182. Link 192 is attached to blocker door 136 at, for example, hinge 166.

Referring to FIG. 2A, thrust reverser 102 is illustrated in a stowed configuration. In the stowed configuration, blocker door 136 assumes a stowed-blocker-door position, such that blocker door 136 does not generally interfere with a bypass flow. Referring to FIG. 2B, thrust reverser 102 is illustrated in a deployed configuration. In the deployed configuration, blocker door 136 assumes a deployed-blocker-door position, such that blocker door 136 extends into and interferes with (e.g., blocks) a bypass flow. In the deployed configuration, a distance 194 between translating sleeve 125 and fixed structure 152 is increased, as compared to distance 194, when translating sleeve 125 is in the stowed configuration of FIG. 2A.

During operation, for example, during a transition of thrust reverser 102 from the stowed configuration to the deployed configuration, sleeve actuator 132 drives first translating sleeve section 124 away from fixed structure 152 (e.g., aft). Driving translating sleeve 125 from the stowed configuration (as illustrated in FIG. 2A) to the deployed configuration (as illustrated in FIG. 2B) causes teeth 188 of primary rod 184 to engage and rotate primary gear 186 in a first circumferential primary gear direction (e.g., counterclockwise). In this regard, translating sleeve 125 and primary gear 186, which is affixed to translating sleeve 125 translate relative to primary rod 184, which is affixed to fixed structure 152, in a first linear direction in response to translation of thrust reverser 102 to the deployed configuration. Translation of translating sleeve 125 in the first linear direction drives rotation of primary gear 186 in the first circumferential primary gear direction. The rotation of primary gear 186 in the first circumferential primary gear direction drives rotation of torque shaft 182 in a first circumferential torque shaft direction (e.g., counterclockwise). Rotation of torque shaft 182 in the first circumferential torque shaft direction, in turn, drives rotation of secondary gear system 190 of secondary actuator 162 in a first gear system direction. Rotation of secondary gear system 190 in the first gear system direction drives translation of link 192 in a first link direction, thereby forcing blocker door 136 into the deployed-blocker-door position.

During a transition of thrust reverser 102 from the deployed configuration to the stowed configuration, sleeve actuator 132 translates translating sleeve 125 toward fixed structure 152. Driving translating sleeve 125 from the deployed configuration (as illustrated in FIG. 2B) to the stowed configuration (as illustrated in FIG. 2A) causes teeth 188 of primary rod 184 to engage and rotate primary gear 186 in a second circumferential primary gear direction (e.g., clockwise) opposite the first circumferential primary gear direction. In this regard, translating sleeve 125 and primary gear 186, which is affixed to translating sleeve 125, translate relative to primary rod 184 in a second linear direction opposite the first linear direction, during translation of thrust reverser 102 to the stowed configuration. The translation of translating sleeve 125 in the second linear direction (e.g., forward) drives rotation of primary gear 186 in the second circumferential primary gear direction. The rotation of primary gear 186 in the second circumferential primary gear direction drives rotation of torque shaft 182 in a second circumferential torque shaft direction (e.g., clockwise) opposite the first circumferential torque shaft direction. Rotation of torque shaft 182 in the second torque shaft direction, in turn, drives rotation of secondary gear system 190 of secondary actuator 162 in a second gear system direction opposite the first gear system direction. Rotation of secondary gear system 190 in the second gear system direction drives translation of link 192 in a second link direction opposite the first link direction, thereby forcing blocker door 136 into the stowed-blocker-door position.

In various embodiments, blocker door 136 may be biased, for example, a pre-load may be applied to blocker door 136 and/or to link 192, in order to force blocker door 136 to remain in the stowed-blocker-door position (i.e., raised) during flight, thereby tending to prevent blocker door 136 from deploying (i.e., lowering) inadvertently and creating drag within the bypass air flow duct.

Figure 3A:
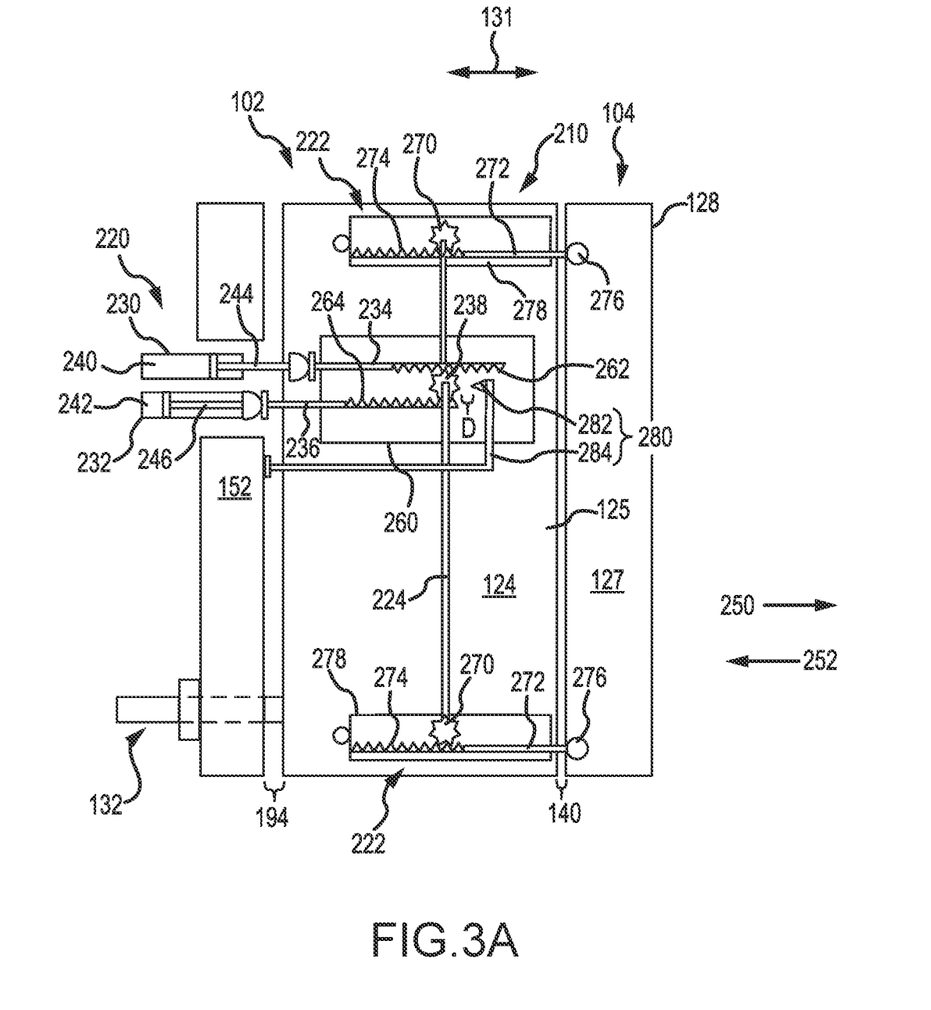
FIG. 3A is a schematic view of a translating sleeve thrust reverser in a stowed configuration, a variable area fan nozzle in a closed position, and a drive system configured to translate a translating nozzle of the variable area fan nozzle and having a lock assembly unlocked state, in accordance with various embodiments.
Figure 3B:
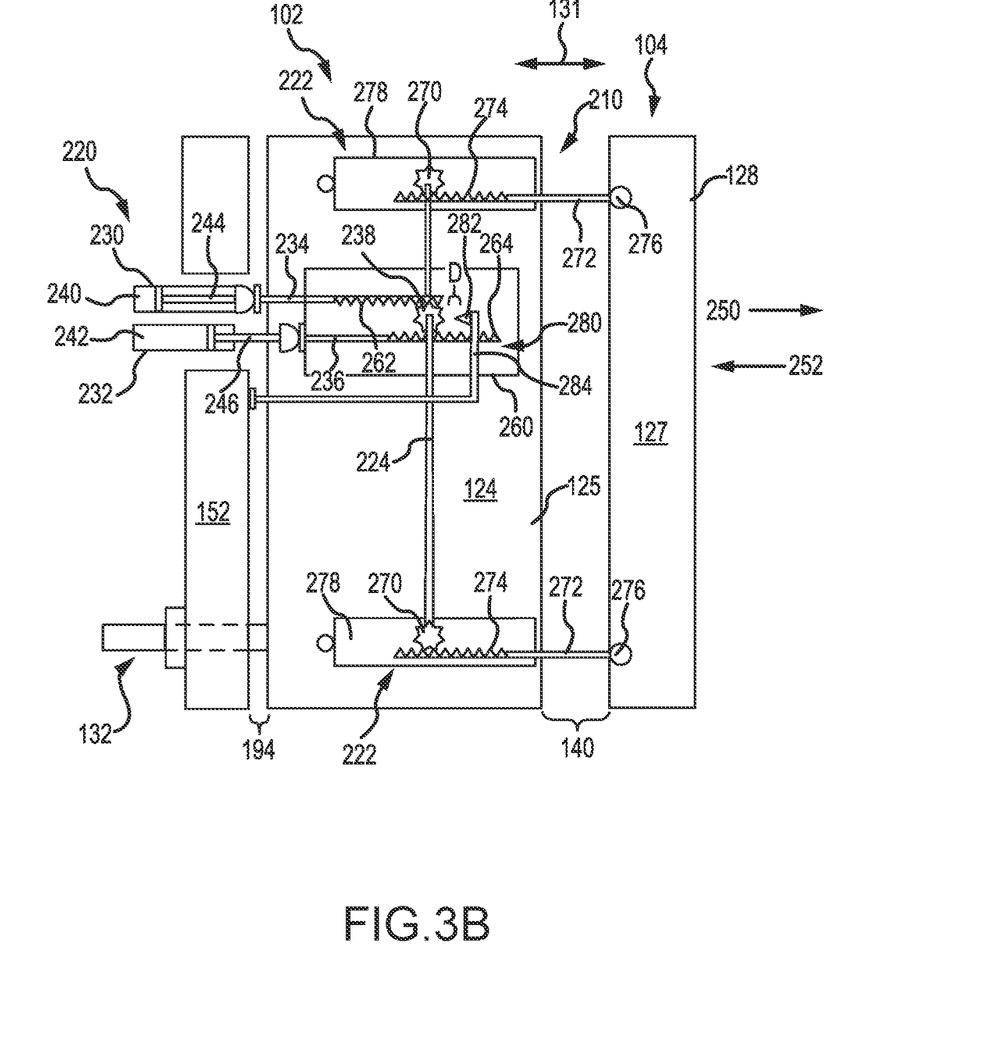
FIG. 3B is a schematic view of a translating sleeve thrust reverser in a stowed configuration, a variable area fan nozzle in an open position, and a drive system configured to translate a translating nozzle of the variable area fan nozzle and having a lock assembly in an unlocked state, in accordance with various embodiments.
Figure 3C:
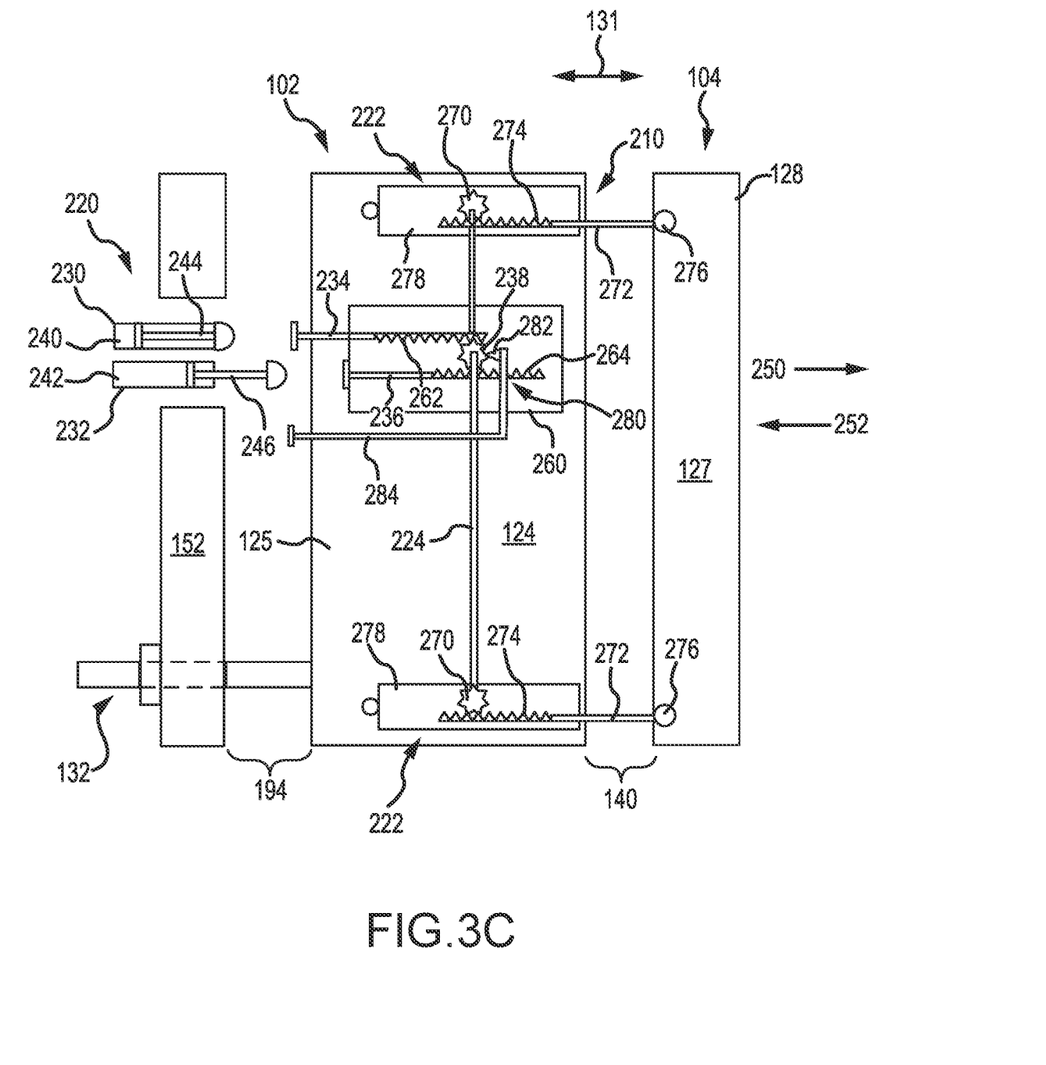
FIG. 3C is a schematic view of a translating sleeve thrust reverser in a deployed configuration, a variable area fan nozzle in an open position, and a drive system configured to translate a translating nozzle of the variable area fan nozzle and having a lock assembly in a locked state, in accordance with various embodiments.

Referring now to FIGS. 3A, 3B and 3C, schematic views of a drive system 210 configured to drive translation of translating nozzle 128. In accordance with various embodiments, thrust reverser 102 is configured to translate between the stowed configuration and the deployed configuration via, for example, drive system 180 as described above with reference to FIGS. 2A and 2B, and variable area fan nozzle 104 is also configured to translate between a closed position and an open position via drive system 210. As described above with reference to FIGS. 1A, 1B, and 1C, translating nozzle 128 is configured for selective translation (e.g., moved fore and aft) to vary exit area "$A_{EXIT}$" of the exit of variable area fan nozzle 104 and to adjust an amount of the bypass flow spilled through upstream exit 140.

In various embodiments, drive system 210 includes a primary (or master) actuator 220, one or more secondary (or slave) actuators 222, and a torque shaft 224 operationally coupling primary actuator 220 and secondary actuator(s) 222. Drive system 210 is configured to translate first nozzle section 127 of translating nozzle 128 in the fore and aft directions (as indicated by bidirectional arrow 131). While FIGS. 3A, 3B and 3C illustrate first nozzle section 127, it should be understood that translating nozzle 128 may include multiple nozzle portions, such as, for example, second nozzle section 129 in FIG. 1A, and that translation of each nozzle portion may be controlled by a nozzle drive system having the elements and functionalities as described herein with reference to nozzle drive system 210.

Primary actuator 220 may be coupled between fixed structure 152 and first translating sleeve section 124 of thrust reverser 102. In various embodiments, primary actuator 220 may include a closing actuator 230, an opening primary actuator 232, a first primary rod 234, a second primary rod, 236, and a primary gear 238. Closing actuator 230 and opening actuator 232 are attached to fixed structure 152. For example, in various embodiments, closing actuator 230 includes a cylinder 240 mounted to fixed structure 152, and opening actuator 232 includes a cylinder 242 mounted to fixed structure 152. Closing actuator 230 further includes a piston 244, which translates linearly (e.g., telescopes) relative to cylinder 240. Opening actuator 232 further includes a piston 246, which translates linearly (e.g., telescopes) relative to cylinder 242. Closing and opening actuators 230, 232 may be hydraulic, pneumatic, electromechanical, or any other desired type of actuator.

Closing actuator 230 drives translation of first primary rod 234 in a first linear direction 250. Opening actuator 232 drives translation of second primary rod 236 in first linear direction 250 (e.g., aft). First and second primary rods 234, 236 may be located, at least partially, within a housing (or other structure) 260 attached to first translating sleeve section 124. Housing 260 is configured to support, or accommodate, linear translation of first and second primary rods 234, 236 as driven by pistons 244, 246, respectively.

In accordance with various embodiments, primary gear 238 is rotationally coupled to first primary rod 234 and second primary rod 236. In various embodiments, first primary rod 234 may include a plurality of teeth 262 configured to engage (e.g., intermeshed with) primary gear 238, and second primary rod 236 may include a plurality of teeth 264 configured to engage (e.g., intermeshed with) primary gear 238. In this regard, primary gear 238 is configured to rotate in response to linear translation (e.g., fore and aft translation) of first primary rod 234 and/or of second primary rod 236. In accordance with various embodiments, torque shaft 224 is rotationally coupled (e.g., via splined connection or any other suitable connection means) to primary gear 238. In this regard, rotation of primary gear 238 drives rotation of torque shaft 224.

In various embodiments, torque shaft 224 may be a single, unibody member rotationally coupled to primary gear 238 and each secondary actuator 222 or in various embodiments, torque shaft 224 may include a plurality of discrete links rotationally coupled between primary gear 238 and secondary actuators 222.

Secondary actuators 222 may be coupled between translating nozzle 128 and translating sleeve 125 (e.g., between first nozzle section 127 of translating nozzle 128 and first translating sleeve section 124 of translating sleeve 125). In accordance with various embodiments, secondary actuators 222 each includes a secondary (or slave) gear 270 and a secondary rod 272. Secondary gear 270 is rotationally coupled to torque shaft 224 (e.g., splined connection or any other suitable connection means), such that rotation of torque shaft 224 drives rotation of secondary gear 270. Secondary gear 270 is also rotationally coupled to secondary rod 272. In various embodiments, secondary rod 272 may include a plurality of teeth 274 configured to engage (e.g., intermeshed with) secondary gear 270. In this regard, rotation of secondary gear 270, as driven by rotation of torque shaft 224, drives linear translation (e.g., fore and aft translation) of secondary rod 272. Secondary rod 272 is attached to first nozzle section 127 at a joint 276. In various embodiments, secondary rod 272 may be located, at least partially, within a housing (or other structure) 278 attached to first translating sleeve section 124. Housing 278 is configured to support and/or accommodate, linear translation of secondary rod 272 as driven by secondary gear 270, which may also be located in housing 278.

Referring to FIG. 3A, variable area fan nozzle 104 is illustrated in a closed or nearly closed position. In the closed position, translating nozzle 128 is located proximate an aft end of first translating sleeve section 124 such that upstream exit 140 is completely closed or otherwise open only a nominal amount. In the closed position, piston 244 of closing actuator 230 is positioned substantially toward, and/or closer to, housing 260 and primary gear 238, as compared to piston 246 of opening actuator 232, which is positioned away from housing 260 and primary gear 238. In this regard, in the closed position, first primary rod 234 may be located closer to translating nozzle 128 as compared to second primary rod 236.

Referring to FIG. 3B, variable area fan nozzle 104 is illustrated in an open position. In the open position, translating nozzle 128 is located distal (i.e., a greater distance from) the aft end of first translating sleeve section 124 such that upstream exit 140 is open an amount greater than the completely closed or nominally open positions, thereby allowing a greater portion of the bypass flow to flow through upstream exit 140. In the open position, piston 244 of closing actuator 230 is positioned substantially away, and/or farther, from housing 260 and primary gear 238, as compared to piston 246 of opening actuator 232, which is positioned substantially toward housing 260 and primary gear 238. In this regard, in the open position, first primary rod 234 may be located farther from translating nozzle 128 as compared to second primary rod 236.

During operation, for example, in response to translation of variable area fan nozzle 104 from the closed position to the open position, opening actuator 232 drives piston 246 out of cylinder 242 and towards second primary rod 236 and primary gear 238, thereby causing second primary rod 236 to translate in first linear direction 250 (e.g., aft). Translation of second primary rod 236 in first linear direction 250 drives rotation of primary gear 238 in a first circumferential primary gear direction (e.g., counterclockwise). Rotation of primary gear 238 in the first circumferential primary gear direction drives first primary rod 234 in a second linear direction 252 (e.g., forward) opposite first linear direction 250. Translation of first primary rod 234 in second linear direction 252 may drive piston 244 in second linear direction 252 and into cylinder 240.

Rotation of primary gear 238 in the first circumferential primary gear direction drives rotation of torque shaft 224 in a first circumferential torque shaft direction (e.g., counterclockwise). Rotation of torque shaft 224 in the first circumferential torque shaft direction drives rotation of secondary gear 270 in a first circumferential secondary gear direction (e.g., counterclockwise). Rotation of secondary gear 270 in the first circumferential secondary gear direction drives linear translation of secondary rod 272 in first linear direction 250, thereby forcing translating nozzle 128 away from translating sleeve 125 (i.e., in first linear direction 250) and increasing an axial length of upstream exit 140.

In response to translation of variable area fan nozzle 104 from the open position to the closed position, closing actuator 230 drives piston 244 out of cylinder 240 and towards first primary rod 234 and primary gear 238, thereby causing first primary rod 234 to translate in first linear direction 250 (e.g., aft). Translation of first primary rod 234 in first linear direction 250 drives rotation of primary gear 238 in a second circumferential primary gear direction (e.g., clockwise) opposite the first circumferential primary gear direction. Rotation of primary gear 238 in the second circumferential primary gear direction drives second primary rod 236 in second linear direction 252 (e.g., forward). Translation of second primary rod 236 in second linear direction 252 may drive piston 246 in second linear direction 252 and into cylinder 242.

Rotation of primary gear 238 in the second circumferential primary gear direction drives rotation of torque shaft 224 in a second circumferential torque shaft direction (e.g., clockwise) opposite the first circumferential torque shaft direction. Rotation of torque shaft 224 in the second circumferential torque shaft direction drives rotation of secondary gear 270 in a second circumferential secondary gear direction (e.g., clockwise). Rotation of secondary gear 270 in the second circumferential secondary gear direction drives linear translation of secondary rod 272 in second linear direction 252, thereby forcing translating nozzle 128 towards translating sleeve 125 (i.e., in second linear direction 252) and decreasing the axial length of upstream exit 140.

Still referring to FIGS. 3A, 3B and 3C, drive system 210 includes a locking assembly 280 configured to block, reduce, or otherwise prevent relative translation between translating sleeve 125 and translating nozzle 128 in response to translation of thrust reverser 102 from the stowed configuration to the deployed configuration (e.g., in response to an increase in distance 194). In various embodiments, for example, locking assembly 280 may include an interference member 282 and a coupling member (e.g., a strut) 284. Interference member 282 may be biased toward primary gear 238. Coupling member 284 may be coupled to interference member 282. Coupling member 284 is configured to maintain locking assembly 280 in an unlocked state, when thrust reverser 102 is in the stowed position, and to cause locking assembly 280 to translate to a locked state, in response to thrust reverser 102 translating to the deployed position.

In the unlocked state (FIGS. 3A and 3B), translating nozzle 128 is allowed to translate fore and aft. In the locked state (FIG. 3C), translating nozzle 128 is locked to translating sleeve 125 and thus travels with translating sleeve 125 as thrust reverser 102 is deployed. In the unlocked state and/or when thrust reverser 102 is in the stowed position, coupling member 284 may contact fixed structure 152. Coupling member 284 being in contact with fixed structure 152 may locate interference member 282 a predetermined distance D away from primary gear 238. In this regard, primary gear 238 may be able to rotate in the first and second circumferential primary gear directions when coupling member is contacting fixed structure 152 (i.e., when locking assembly 280 is in the unlocked state). In the locked state and/or in response to translation of thrust reverser 102, from the stowed configuration to the deployed configuration, coupling member 284 separates from (i.e., does not contact) fixed structure 152. In response to coupling member 284 being separated from fixed structure 152, the biasing force applied to interference member 282 forces interference member 282 into contact with primary gear 238, thereby generating an interference with primary gear 238 that prevents or reduces rotation of primary gear 238. Blocking rotation of primary gear 238 prevents or reduces linear translation of translating nozzle 128 with respect to translating sleeve 125. In this regard, as distance 194 increases, that axial length of upstream exit 140 (i.e., the distance between translating nozzle 128 and translating sleeve 125) tends to remain constant. While the disclosure generally focuses on interference member 282 being configured to contact and/or block rotation of primary gear 238, it is further contemplated and understood that locking assembly 280 may also or instead be configured to block rotation of torque shaft 224 and/or to block rotation of secondary gear 270.

Figure 4A:
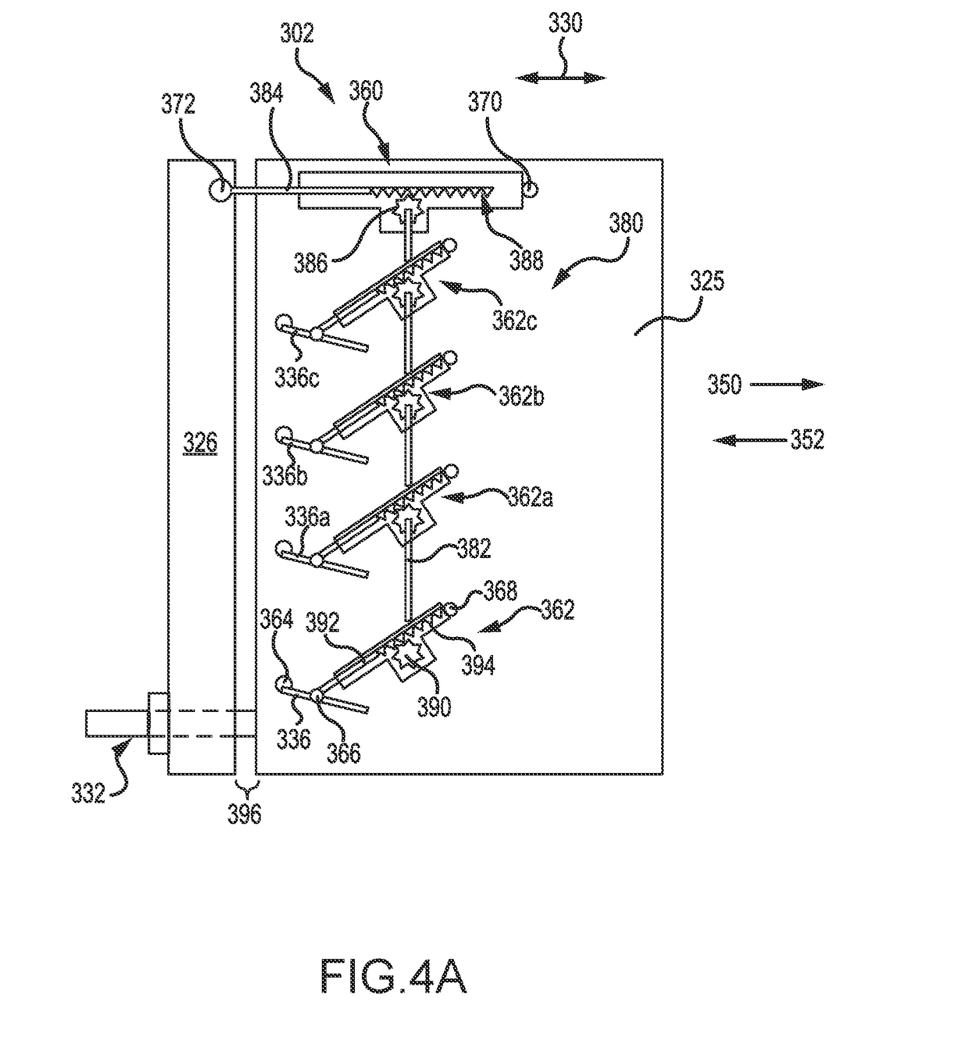
FIG. 4A is a schematic view of a translating sleeve thrust reverser in a stowed configuration and a drive system configured to control a position of the blocker doors of the thrust reverser, in accordance with various embodiments.
Figure 4B:
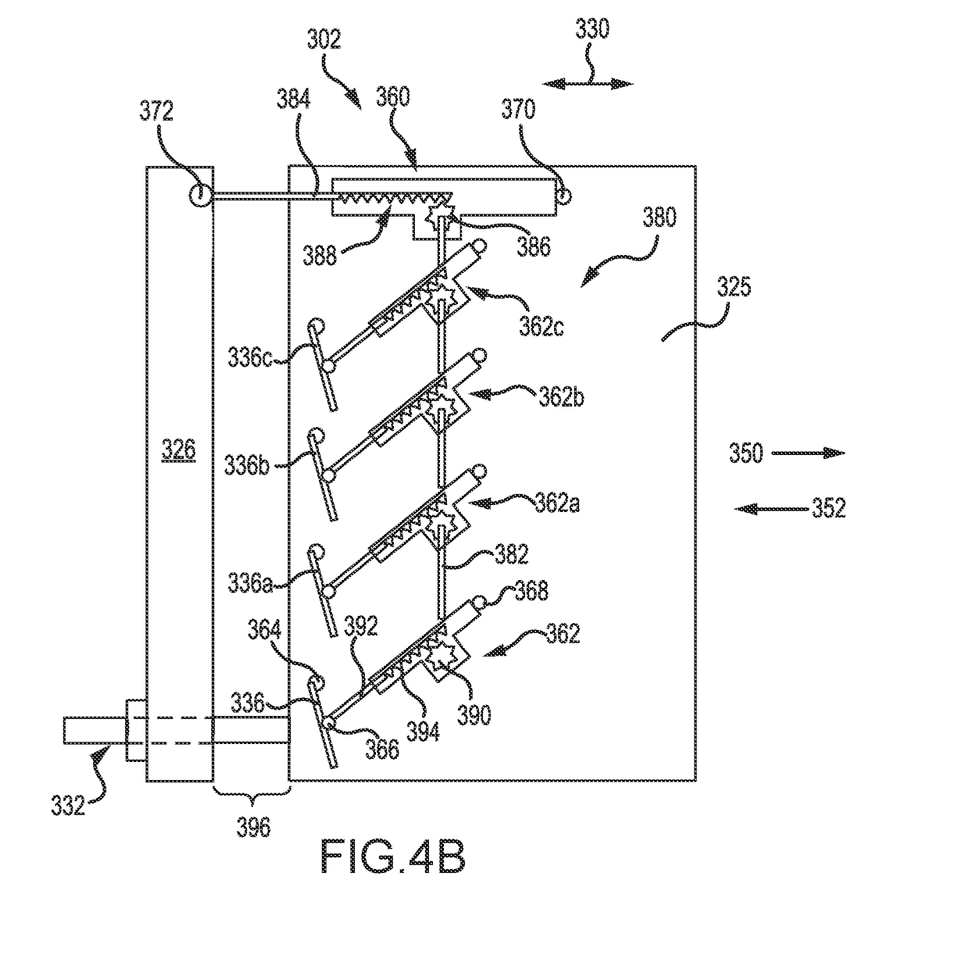
FIG. 4B is a schematic view of a translating sleeve thrust reverser in a deployed configuration and a drive system configured to control a position of the blocker doors of the thrust reverser, in accordance with various embodiments.

Referring now to FIGS. 4A and 4B, schematic views of a thrust reverser 302 configured to translate between a stowed configuration and a deployed configuration, respectively, are provided. In various embodiments, nacelle 108 in FIGS. 1A, 1B, and 1C may include thrust reverser 302 in place of thrust reverser 102. Thrust reverser 302 includes a translating sleeve 325 configured to translate in fore and aft directions (as indicated by the bidirectional arrow 330) and is operated by a sleeve actuator 332, which may comprise any suitable actuation system capable of driving a rapid translation of translating sleeve 325 for deployment of thrust reverser 302, such as, for example, a ball screw mechanism or a hydraulic cylinder. In various embodiments, sleeve actuator 332 is connected between a fixed structure 326, such as, for example, a torque box, and translating sleeve 325. In various embodiments, thrust reverser 302 includes a blocker door 336, similar to the blocker door 136 described above with reference to FIGS. 1B and 1C. As also described above, blocker door 336 is configured to block a portion of a bypass flow when thrust reverser 302 is in a deployed configuration. A primary (or master) actuator 360 is connected between fixed structure 326 and translating sleeve 325. A secondary (or slave) actuator 362 is connected between translating sleeve 325 and blocker door 336. While, for clarity, the disclosure generally focuses on operation of blocker door 336 and secondary actuator 362, it shall be appreciated, as illustrated in FIGS. 4A and 4B, that thrust reverser 302 may include a plurality of blocker doors (e.g., a first blocker door 336, a second blocker door 336a, a third blocker door 336b, and a fourth blocker door 336c) operated by a plurality of secondary actuators (e.g., a first secondary actuator 362, a second secondary actuator 362a, a third secondary actuator 362b, and a fourth secondary actuator 362c).

In various embodiments, blocker door 336 may be coupled at a hinge 364 to the translating sleeve 225 and at a hinge 366 to secondary actuator 362. Secondary actuator 362 may be coupled to translating sleeve 325 at any suitable location, such as at a joint 368. Hinge 364, hinge 366, and/or joint 368 are configured to enable blocker door 336 to pivot relative to translating sleeve 325 and in radially inward direction toward an inner fixed structure, such as, for example, inner fixed structure 110 described above with reference to FIGS. 1B and 1C, as translating sleeve 325 translates aft (i.e., away from fixed structure 326). In various embodiments, primary actuator 360 is coupled to translating sleeve 325 at a joint 370 and to fixed structure 326 at a joint 372.

With continued reference to FIGS. 4A and 4B, thrust reverser 302 includes a drive system 380 configured to control translation of blocker door 336. Drive system 380 includes primary actuator 360, secondary actuator(s) 362, and a torque shaft 382 operationally coupling primary actuator 360 and secondary actuator(s) 362. In various embodiments, torque shaft 382 may be a single, unibody member rotationally coupled to primary actuator 360 and each secondary actuator 362, or in various embodiments, torque shaft 382 may include a plurality of discrete links rotationally coupled between primary actuator 360 and secondary actuators 362.

In various embodiments, primary actuator 360 includes a primary rod 384 and a primary (or master) gear 386 rotationally coupled to primary rod 384. Primary rod 384 may be attached to fixed structure 326 at joint 372. Primary rod 384 may include a plurality of teeth 388 configured to engage (e.g., intermeshed with) primary gear 386. In this regard, primary gear 386 is configured to rotate in response to linear translation of primary rod 384 (e.g., fore and aft translation). In accordance with various embodiments, torque shaft 382 is rotationally coupled (e.g., via splined connection or any other suitable connection means) to primary gear 386. In this regard, rotation of primary gear 386 drives rotation of torque shaft 382.

In accordance with various embodiments, secondary actuator 362 includes a secondary (or slave) gear 390 and a link 392. Secondary gear 390 is rotationally coupled to torque shaft 382, such that rotation of torque shaft 382 drives rotation of secondary gear 390. Rotation of secondary gear 390 is configured to drive a linear translation of secondary rod 392. Secondary rod 392 may include a plurality of teeth 394 configured to engage (e.g., intermeshed with) secondary gear 390. In this regard, rotation of secondary gear 390 causes secondary rod 392 to translate toward and away from blocker door 336. Secondary rod 392 is attached to blocker door 336 at, for example, hinge 366.

Referring to FIG. 4A, thrust reverser 302 is illustrated in a stowed configuration. In the stowed configuration, blocker door 336 is in a stowed-blocker-door position, such that blocker door 336 does not generally interfere with a bypass flow. Referring to FIG. 4B, thrust reverser 302 is illustrated in a deployed configuration. In the deployed configuration, blocker door 336 is in a deployed-blocker-door position, wherein blocker door 336 extends into and interferes with (e.g., blocks) a bypass flow. In the deployed configuration, a distance 396, between translating sleeve 325 and fixed structure 326 is increased as compared to distance 396 when translating sleeve 325 is in the stowed configured illustrated in FIG. 4A.

During operation, thrust reverser 302 may translate from the stowed configuration to the deployed configuration, with sleeve actuator 332 driving translating sleeve 325 away from fixed structure 326 (e.g., aft). Translation of translating sleeve 325 from the stowed configuration (as illustrated in FIG. 4A) to the deployed configuration (as illustrated in FIG. 4B) causes teeth 388 of primary rod 384 to engage and rotate primary gear 386 in a first primary circumferential direction (e.g., counterclockwise). In this regard, translating sleeve 325 and primary gear 386, which is affixed to translating sleeve 325, translate relative to primary rod 384, which is coupled to fixed structure 326, in a first linear direction 350. Translation of translating sleeve 325 in first linear direction 350 drives rotation of primary gear 386 in the first circumferential primary gear direction. The rotation of primary gear 386 in the first circumferential primary gear direction drives rotation of torque shaft 382 in a first circumferential torque shaft direction (e.g., counterclockwise). Rotation of torque shaft 382 in the first circumferential torque shaft direction, in turn, drives rotation of secondary gear 390 of secondary actuator 362 in a first circumferential secondary gear direction (e.g., counterclockwise). Rotation of secondary gear 390 in the first circumferential secondary gear direction drives translation of secondary rod in a first rod direction, thereby forcing blocker door 336 into the deployed-blocker-door position.

During a transition of thrust reverser 302 from the deployed configuration to the stowed configuration, sleeve actuator 332 translates translating sleeve 325 towards fixed structure 326 (e.g., forward). Driving translating sleeve 325 from the deployed configuration (as illustrated in FIG. 4B) to the stowed configuration (as illustrated in FIG. 4A) causes teeth 388 of primary rod 384 to engage and rotate primary gear 386 in a second circumferential primary gear direction (e.g., clockwise) opposite the first circumferential primary gear direction. In this regard, translating sleeve 325 and primary gear 386, which is attached to translating sleeve 325 translate relative to primary rod 384, which is attached to fixed structure 326, in a second linear direction 352 (e.g., forward) opposite the first linear direction 350, in response to translation of thrust reverser 302 to the stowed configuration. Translation of translating sleeve 325 in second linear direction 352 drives rotation of primary gear 386 in the second circumferential primary gear direction, which in turn drives rotation of torque shaft 382 in a second circumferential torque shaft direction (e.g., clockwise) opposite the first circumferential torque shaft direction. Rotation of torque shaft 382 in the second torque shaft direction, in turn, drives rotation of secondary gear 390 of secondary actuator 362 in a second circumferential secondary gear direction (e.g., clockwise) opposite the first circumferential secondary gear direction. Rotation of secondary gear 390 in the second circumferential secondary gear direction drives translation of secondary rod 392 in a second rod direction opposite the first link direction, thereby forcing blocker door 336 into the stowed-blocker-door position.

In various embodiments, blocker door 336 may be biased, for example, a pre-load may be applied to blocker door 336 and/or to secondary rod 392 and/or secondary gear 390, to force blocker door 336 to remain in the stowed-blocker-door position (i.e., raised) during flight, thereby tending to prevent blocker door 336 from deploying (i.e., lowering) inadvertently and creating drag within the bypass air flow duct.

While drive system 180 in FIG. 2, drive system 210 in FIG. 3A, and drive system 380 in FIG. 4A are illustrated as having one primary actuator, it is further contemplated and understood that the drive systems may include multiple primary actuators. For example, and with reference to FIG. 5, a schematic view of a drive system 480 including first master actuator 420 and second master actuator 422 is illustrated. Drive system 480 may be operationally coupled to a thrust reverser 402, similar to thrust reverser 102 in FIG. 1A. Thrust reverser 402 is configured to translate between a stowed configuration and a deployed configuration is provided. In various embodiments, nacelle 108 in FIGS. 1A, 1B, and 1C may include thrust reverser 402 in place of thrust reverser 102. Thrust reverser 402 includes a translating sleeve 425 configured to translate in fore and aft directions (as indicated by the bidirectional arrow 430). Translating sleeve 425 may be operated by a sleeve actuator 432, which may comprise any suitable actuation system capable of driving a rapid translation of translating sleeve 425 for deployment of thrust reverser 402.

Figure 5:
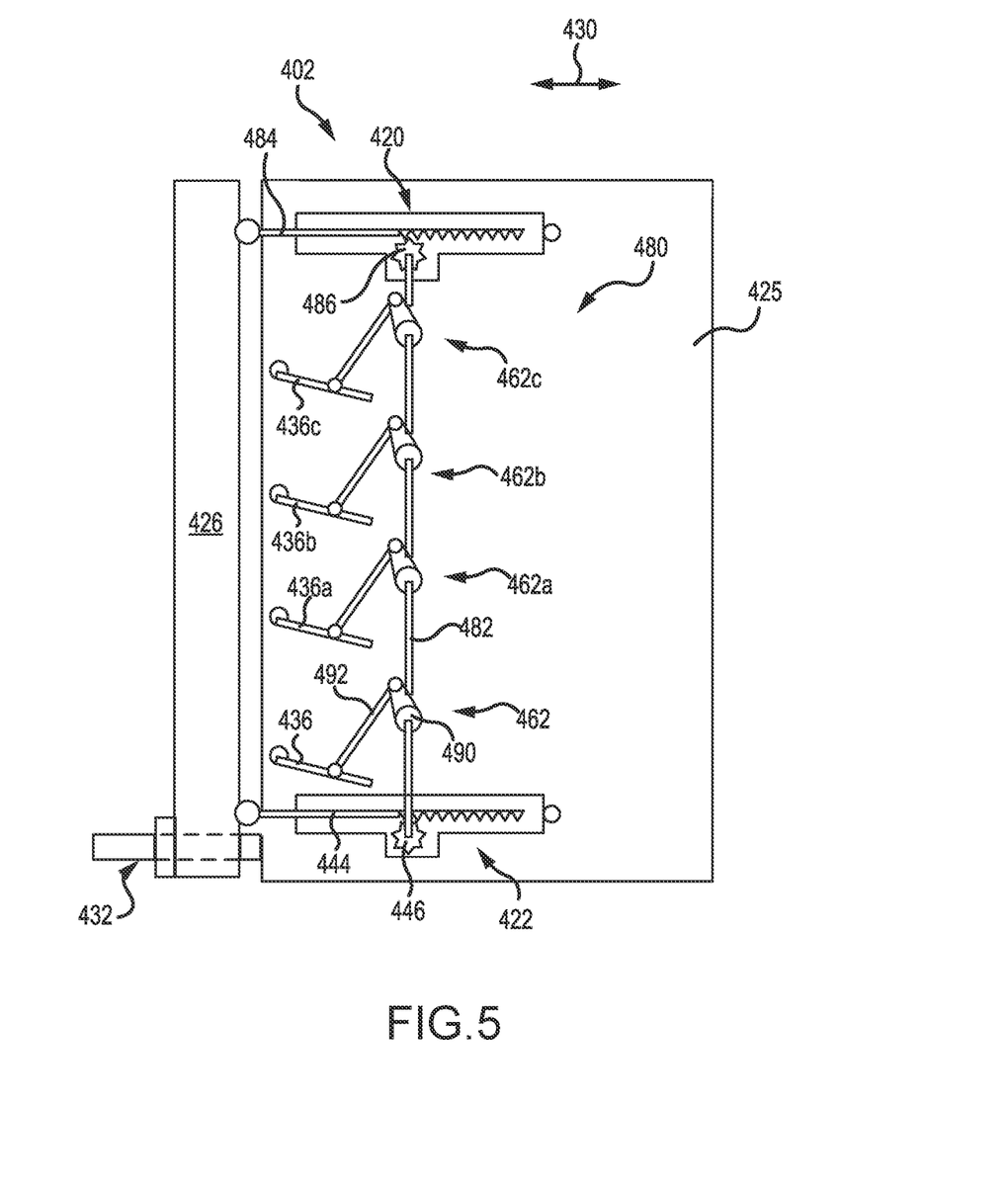
FIG. 5 is a schematic view of a translating sleeve thrust reverser in a stowed configuration and a drive system configured to control a position of the blocker doors of the thrust reverser, in accordance with various embodiments.

In various embodiments, sleeve actuator 432 is connected between a fixed structure 426, such as, for example, a torque box, and translating sleeve 425. In various embodiments, thrust reverser 402 includes a blocker door 436, similar to the blocker door 136 described above with reference to FIGS. 1B and 1C. As also described above, blocker door 436 is configured to block a portion of a bypass flow when thrust reverser 402 is in a deployed configuration.

First primary (or master) actuator 420 and second primary actuator are connected between fixed structure 426 and translating sleeve 425. A secondary (or slave) actuator 462 is connected between translating sleeve 425 and blocker door 436. While, for clarity, the disclosure generally focuses on operation of blocker door 436 and secondary actuator 462, it shall be appreciated, as illustrated in FIG. 5, that thrust reverser 402 may include a plurality of blocker doors (e.g., a first blocker door 436, a second blocker door 436a, a third blocker door 436b, and a fourth blocker door 436c) operated by a plurality of secondary actuators (e.g., a first secondary actuator 462, a second secondary actuator 462a, a third secondary actuator 462b, and a fourth secondary actuator 462c).

With continued reference to FIG. 5, thrust reverser 402 includes drive system 480 configured to control translation of blocker door 436. Drive system 480 includes first and second primary actuators 420, 422, secondary actuator(s) 462, and a torque shaft 482 operationally coupling first primary actuator 420 and secondary actuator(s) 462 and second primary actuator 422 and secondary actuator(s) 462. In various embodiments, torque shaft 482 may be a single, unibody member rotationally coupled to first and second primary actuators 420, 422 and each secondary actuator 462, or in various embodiments, torque shaft 482 may include a plurality of discrete links rotationally coupled between first primary actuator 420, secondary actuators 462, and second primary actuator 422.

In various embodiments, first primary actuator 420 includes a first primary rod 484 and a first primary (or master) gear 486 rotationally coupled to first primary rod 484. In various embodiments, second primary actuator 422 includes a second primary rod 444 and a second primary (or master) gear 446 rotationally coupled to second primary rod 444 First and second primary rods 484, 444 may be attached to fixed structure 426 and are configured to engage (e.g., are intermeshed with) first and second primary gears 486, 446, respectively. In this regard, first and second primary gears 486, 446 are configured to rotate in response to linear translation (e.g., fore and aft translation) of translating sleeve 425 relative to first and second primary rods 484, 444. In accordance with various embodiments, torque shaft 482 is rotationally coupled (e.g. via splined connection or any other suitable connection means) to first and second primary gears 486, 446. In this regard, rotation of first and second primary gears, 486, 446 drive rotation of torque shaft 482, which in turn drives rotation of the secondary (slave) gears 490 of secondary actuators 462. Rotation of secondary gears 490 drives translation of links 492, thereby translating blocker doors 436 between the stowed-blocker-door and deployed-blocker-door position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A drive system for translating a translating nozzle of a variable area fan nozzle of a nacelle relative to a thrust reverser and a fixed structure of the nacelle, the drive system comprising:
    a primary actuator including:
        an opening actuator configured to attach to the fixed structure;
        a closing actuator configured to attach to the fixed structure;
        a first primary rod configured to be driven by the opening actuator;
        a second primary rod configured to be driven by the closing actuator; and
        a primary gear rotationally coupled to the first primary rod and the second primary rod;
    a torque shaft rotationally coupled to the primary gear; and
    a secondary actuator operationally coupled to the primary actuator via the torque shaft, the secondary actuator comprising:
        a secondary gear rotationally coupled to the torque shaft; and
        a secondary rod configured to be driven linearly by the secondary gear.

2. The drive system of claim 1, wherein the secondary rod includes a plurality of teeth configured to engage the secondary gear.

3. The drive system of claim 1, wherein the secondary rod is configured to attach to the translating nozzle.

4. The drive system of claim 1, wherein the primary gear is configured to attach to the thrust reverser.

5. The drive system of claim 1, further comprising a locking assembly configured to restrict translation of the translating nozzle relative to the thrust reverser in response to deployment of the thrust reverser.

6. The drive system of claim 5, wherein the locking assembly comprises:
    an interference member biased toward the primary gear; and
    a contact member coupled to the interference member and configured to contact the fixed structure when the thrust reverser is in a stowed configuration.

7. A drive system for translating a translating sleeve of a thrust reverser of a nacelle relative to a fixed structure of the nacelle, the drive system comprising:
    a first primary actuator including:
        a first primary rod configured to attach to the fixed structure; and
        a first primary gear rotationally coupled to the first primary rod;
    a torque shaft rotationally coupled to the first primary gear;
    a secondary actuator operationally coupled to the first primary actuator via the torque shaft, wherein the secondary actuator is configured to rotate a blocker door of the thrust reverser between a stowed-blocker-door position and a deployed-blocker-door position in response to rotation of the first primary gear, wherein the secondary actuator comprises:
        a secondary gear rotationally coupled to the torque shaft; and
        a secondary rod including a plurality of teeth configured to engage the secondary gear, wherein the secondary rod is configured to rotate the blocker door in response to rotation of the secondary gear,
    wherein the first primary gear is configured to translate linearly relative to the first primary rod in response to a deployment of the translating sleeve.

8. The drive system of claim 7, wherein the secondary actuator is configured to rotate the blocker door to the deployed-blocker-door position in response to rotation of the first primary gear in a first circumferential primary gear direction.

9. The drive system of claim 8, wherein the secondary actuator is configured to rotate the blocker door to the stowed-blocker-door position in response to rotation of the first primary gear in a second circumferential primary gear direction opposite the first circumferential primary gear direction.

* * * * *